(12) United States Patent
Gerrits

(10) Patent No.: US 9,036,213 B2
(45) Date of Patent: May 19, 2015

(54) METHOD FOR SEMI-CORRELATED HALFTONING

(71) Applicant: OCE TECHNOLOGIES B.V., Venlo (NL)

(72) Inventor: Carolus E. P. Gerrits, Velden (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 102 days.

(21) Appl. No.: 13/785,556

(22) Filed: Mar. 5, 2013

(65) Prior Publication Data
US 2013/0188226 A1    Jul. 25, 2013

Related U.S. Application Data

(63) Continuation of application No. PCT/EP2012/050168, filed on Jan. 6, 2012.

(30) Foreign Application Priority Data

Jan. 12, 2011  (EP) .................................... 11150709

(51) Int. Cl.
H04N 1/405 (2006.01)
G06K 15/02 (2006.01)
H04N 1/52 (2006.01)

(52) U.S. Cl.
CPC .............. G06K 15/1881 (2013.01); H04N 1/52 (2013.01)

(58) Field of Classification Search
USPC ........................................................ 358/3.1
See application file for complete search history.

(56) References Cited

U.S. PATENT DOCUMENTS

| 6,250,733 | B1 * | 6/2001 | Yao et al. ......................... 347/15 |
| 7,095,530 | B2 | 8/2006 | Mantell et al. |
| 2003/0227638 | A1 * | 12/2003 | Draaisma ....................... 358/1.9 |
| 2004/0114168 | A1 * | 6/2004 | Kuiper ........................... 358/1.9 |

FOREIGN PATENT DOCUMENTS

| EP | 1443748 A1 | 8/2004 |
| EP | 1300000 B1 | 9/2004 |

OTHER PUBLICATIONS

Wang et al., "Properties of Jointly-Blue Noise Masks and Applications to Color Halftoning", Journal of Imaging Science and Technology, vol. 44, No. 4, Jul.-Aug. 2000, pp. 360-370 and 386.
Yao et al., "Application of Blue Noise Mask in Color Halftoning", Proceedings of SPIE vol. 2727, Jan. 1, 1996, pp. 876-880.

* cited by examiner

*Primary Examiner* — Benny Q Tieu
*Assistant Examiner* — Michael Y Tzeng
(74) *Attorney, Agent, or Firm* — Birch, Stewart, Kolasch & Birch, LLP

(57) ABSTRACT

A method for image processing a digital color image uses a single array of threshold values in a halftoning process if a total density value, which is found adding up the color density value for each of the process colors of a pixel, is lower than a predetermined density threshold. However, when the total density value exceeds the density threshold, the individual color density values are split in a basic part and an excess part, the basic parts adding up to the predetermined density threshold. In the halftoning process the basic parts still use the single array of threshold values, but the excess parts use uncorrelated arrays of threshold values that are associated with each individual process color. This provides for a balance between graininess at low color density and registration independent color rendering at high color density.

10 Claims, 4 Drawing Sheets

METHOD FOR SEMI-CORRELATED HALFTONING

CROSS-REFERENCE TO RELATED APPLICATIONS

This application is a Continuation of PCT International Application No. PCT/EP2012/050168 filed on Jan. 6, 2012, which claims priority under 35 U.S.C 119(a) to European Application No. 11150709.1 filed Jan. 12, 2011, all of which are hereby expressly incorporated by reference into the present application.

BACKGROUND OF THE INVENTION

1. Field of the Invention

The invention relates to a method for image processing a digital color image to obtain a print signal, that indicates for each pixel whether a dot of marking material of a corresponding process color is to be applied. The invention further relates to a computer readable medium comprising computer executable instructions and to a color printer system comprising a controller for scheduling and interpreting print jobs and a print engine for marking support material.

2. Description of the Related Art

Digital color images exist in various forms and originate from different sources. They exist in the form of descriptive elements in a page description language (PDL), generated by a computer application. They also exist in the form of a pixel map, in which the image is divided into pixels that carry specifications of the local color of the image, such as images originating from scanners or digital cameras. In order to print these images, a color printer is used with a number of process colors in the form of marking material, that is applied to a support material, such as paper, that receives the image. In most printers, these process colors comprise black, cyan, magenta, and yellow marking material.

Before a print process can be started, a digital separation image is derived for each process color from the digital color image. The digital separation image specifies for each pixel of an image to be printed, a color density value that is representative for the amount of marking material that is to be applied for that pixel. The color density value can be expressed as a percentage between 0% and 100%, wherein a value of 0% for an area with several pixels leads to a minimum amount of marking material for that area and a value of 100% for an area with several pixels leads to a maximum amount of marking material for that area. The color of each pixel is thus represented by a combination of process colors.

A print process is often only capable of printing a fixed amount of marking material on a print position or no marking material at all. A print position is a part of the image on the support material and the fixed amount of marking material is a dot that can be placed on this position. In an image processing step commonly referred to as halftoning, the digital separation image for each process color is converted into a print signal that for each print position has one of two possible values indicating whether or not to apply a dot. This is done in a way that keeps the average marking material density around the print position equal to the color density value of the associated pixel. A well-known way to apply halftoning is dithering, in which a threshold value is associated with each print position. The color density value of a pixel associated to the print position is compared to this threshold value to obtain a value of the print signal. For color density values larger than the associated threshold value, a dot is applied, for color density values smaller or equal to the associated threshold value, no dot is applied. An array of threshold values is associated with each process color to derive a print signal that indicates the dots of marking material.

The distribution of the threshold values over the various print positions determine the dot patterns that occur for various color density values. An array of threshold values is repeatedly applied to associate every part of the image with a threshold value. The oldest dithering techniques use a different array of threshold values for each process color. This causes independent dot patterns for different colors with the effect that a difference in registration of one of the colors does not effect the color impression of the combined dot patterns. In arrays of threshold values for dispersed dithering, the threshold values are distributed in such a way that when a dot pattern is extended with a next dot, this next dot is placed remote from the already existing dots. However, the position of a next dot of another color is uncorrelated with the already existing dots of the first color, because a different array of thresholds is used. This causes some dots of two process colors to be placed on top of each other, while also print positions exist that receive no dot at all. The resulting print quality of the image shows a certain graininess by this.

In patent specifications EP 1,300,000 and U.S. Pat. No. 6,250,733, the dot positions of several colors are derived from only one array of threshold values. In that way, no dots will be put onto each other before all print positions have received a dot. When all print positions receive a dot, a next dot will be placed again on the first print positions, i.e. print positions that are used for dots at very low densities, making those print positions the first ones that receive two dots onto each other. To improve the registration latitude, the patent specification U.S. Pat. No. 7,095,530 already starts using the first print positions of the only array of threshold values before all print positions of the support material have received a dot.

In patent specification EP1,443,748, one threshold array is used until all print positions have received a dot and in case more dots are defined, another threshold array is used, which is uncorrelated with the first one. This prevents image artifacts, such as Moire and other undesired interference patterns for certain combinations of color densities. However, a problem still exists in the balance between graininess in the image and the sensitivity for misregistration between various process colors. Therefore, an object of the invention is to provide a method that improves this balance between these print quality aspects.

SUMMARY OF THE INVENTION

According to the present invention, each process color is associated with an array of threshold values, wherein the separate arrays of thresholds are mutually uncorrelated. For each pixel, a total density value is determined by adding up the color density values of all process colors. If this total density value is larger than a predetermined density threshold, the color density value of each process color is split into a basic part and an excess part. The sum of the basic part of all process colors is made equal to the predetermined density threshold, which is, according to the present invention, lower than 100%. The basic parts of the color density values are converted into a print signal using only one of the arrays of thresholds. The excess part of each process color is converted into a print signal with the array of density thresholds that is associated with the digital separation image corresponding to the process color. If the total density value is not larger than the predetermined density threshold, the basic part of each process color equals the color density value of that process color and the excess parts are zero. In that case, the sum of the basic parts is equal to the total density value. All the basic parts are converted into a print signal using only one of the arrays of thresholds.

The effect of the present invention is that for low total densities only one array of thresholds is used for all process colors, which is optimal for achieving a low graininess in the printed image. For high total densities, effectively uncorrelated arrays of threshold values are used, which is optimal for achieving a low sensitivity for registration differences between the process colors.

In an embodiment, the array of threshold values that is associated with the process color black is used in the halftoning process for the basic parts of the image density values. The black dots have the strongest effect on graininess in the printed image, so it is preferred that these dots remain remotely separated, even when the image density of the black process color passes the density threshold.

In an embodiment, the threshold density is between 5 and 30%. It has been found, that it is sufficient for the enhancement of the print quality to reduce the graininess by placing dots using a single array of threshold values for all process colors only for these low total density values. In a further embodiment, the threshold density is between 10% and 20%.

The invention encompasses also a software product and a color printer system implementing the method that has been described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
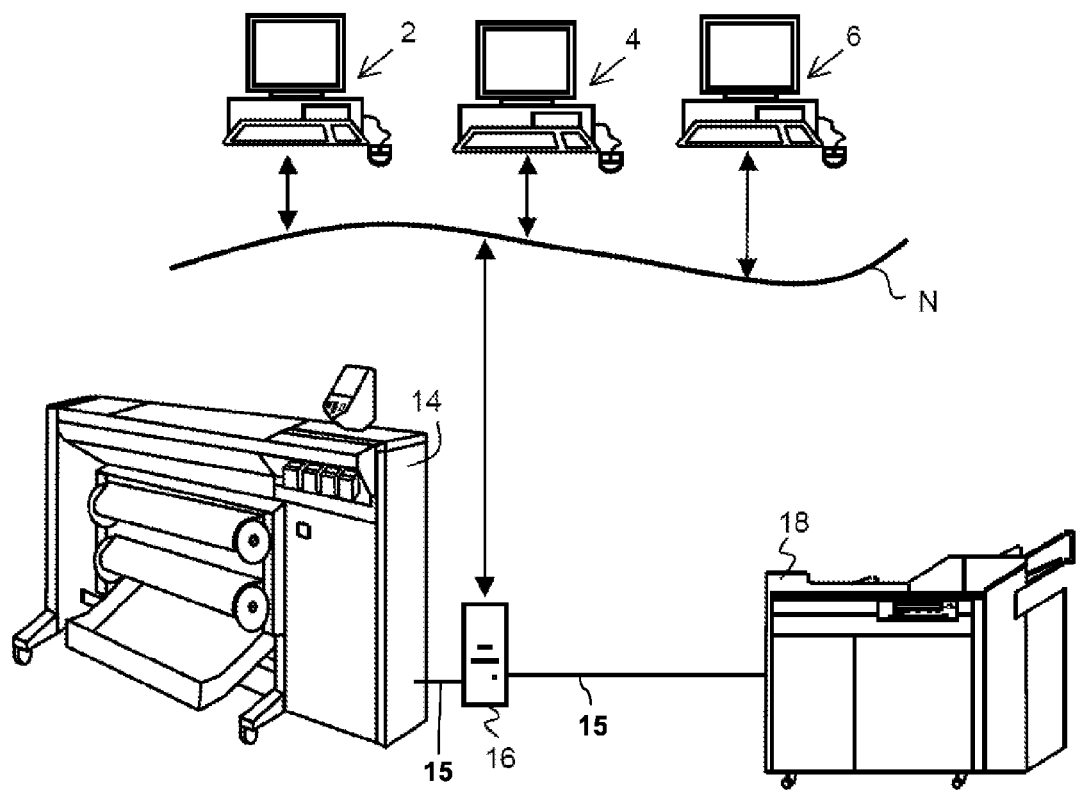
FIG. 1 shows a color printer system.

A number of embodiments will now be described in conjunction with the drawings, in which same reference numerals refer to like elements.

The color printer system in FIG. 1 comprises a number of workstations (2, 4, 6) that are connected to a controller computer 16 through a network N. On the workstations, print jobs are prepared involving documents in various formats and various sizes. The data in these documents originate from different sources, such as scanners, digital camera's and computer applications. The print jobs may be sent to the controller computer, where the jobs are analyzed and the documents converted into image data that are appropriate to be accepted by one of the printers connected to the controller computer. In the present embodiment, a printer 14 for large size documents, such as CAD drawings and banners, is available and a printer 18 for office size documents, such as A4 and A3 sized support sheets of paper, connected to the controller computer by a means for data transfer 15. In the process of converting, the documents are rasterized and rendered employing the process colors of the printer to be used. In this process, also a number of methods may be applied that improve the appearance of the image on the support material that is used in the printer. The image data are compressed before being sent to the printer and possibly saved on a non-volatile memory in the controller, such as a hard disk.

Figure 2:
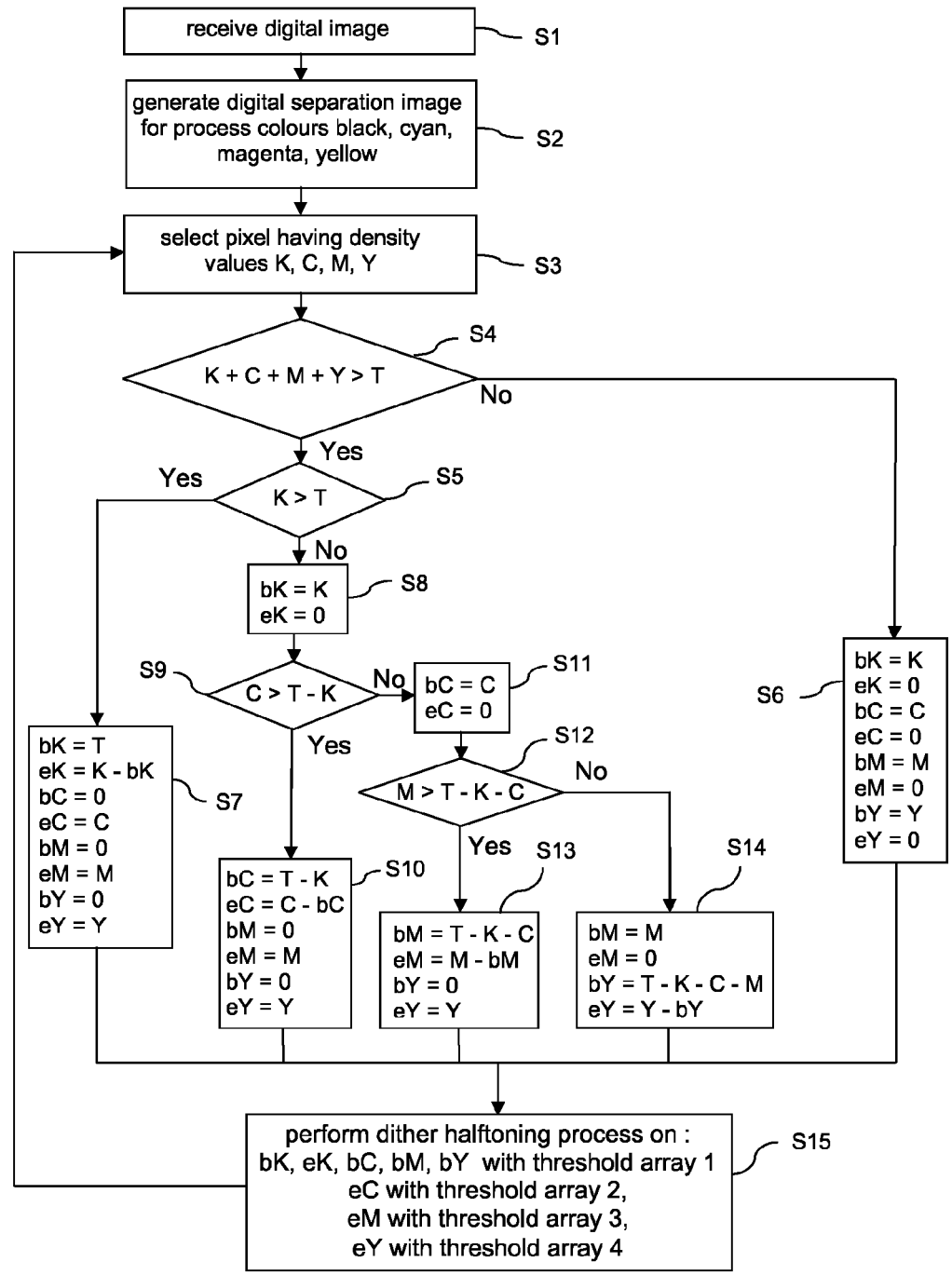
FIG. 2 is a flow diagram of an embodiment of the invented method.

The steps of an embodiment of the method according to the present invention have been summarized in FIG. 2. It will be understood that the method may be carried out, for example, by an image processor that forms part of a digital color printer. As an alternative, the method may be carried out on a multipurpose computer loaded with suitable software so as to process an image file that will then be sent to a color printer for being printed. In step S1, a digital image is received by a computer with an image processor. From the digital image, a separation image for each of the process colors of the printer is generated in step S2, e.g. by rasterising the elements of the digital image and applying a color profile, that converts the colors used in the digital image into color density values of the available process colors. In this embodiment, the process colors are black, cyan, magenta and yellow, but the method may equally well be applied for other and more process colors. In step S3, a pixel is selected. The color density values of this pixel are indicated by K, C, M, and Y for the respective process colors. In step S4, the sum of these color density values is compared to the predefined density threshold T. Note that T may depend among other things on the coverage of a drop on the support material, the drop being caused by the application of a dot. If e.g. a drop of ink spreads very much, it will leave less uncovered area of the support material than in the case a drop does not spread very much. In the first situation, the value of T may be selected lower than in the second situation. Therefore, the value of T may depend on the deposition process, the support material, the type of ink, etc. If the result of the comparison in S4 is negative ("No"), step S6 is executed, in which the basic parts of the color density values, indicated by bK, bC, bM, bY are made equal to the color density values and the excess part of the color density values, indicated by eK, eC, eM, eY are made zero. If the result of step S4 is positive ("Yes"), a next comparison is executed in step S5. Herein, only the color density value of the black process color K is compared to the total density threshold T. The process color K is used as an example, any other available process color may also be selected. If K is larger than T ("Yes"), step S7 is executed, making the basic part of K, bK, equal to T. The other basic parts, bC, bM, bY are made zero. Note that the sum of the basic parts is equal to T after this step. If the result of the comparison in step S5 is negative ("No"), in step S8, the values of the basic part of K, bK, and the excess part eK are set and a next comparison is executed in step S9. If C, the color density value for cyan, is larger than the difference between T and K ("Yes"), then step S10 is executed, splitting C in a part bC and eC, both not equal to zero. Note that also after this step S10 the sum of the basic parts is equal to T. If the result of step S9 is negative ("No"), bC and eC are given a value in step S11 and a last comparison takes place in step S12. If M is larger than the difference between T and K and C ("Yes"), then M is split in a part bM and eM in step S13, whereas bY is set to zero. Again, the sum of the basic parts is equal to T. If the result of the comparison in step S12 is negative ("No"), Y is split in step S14 in a part bY and eY, both not equal to zero. After having established the basic parts and excess parts in these steps, a dither halftoning process is executed on the various parts with the threshold arrays as indicated in step S15. Thereafter, a next pixel is selected in step S3 until all pixels have been processed. Since the dot patterns of the various colors are correlated up to a certain density threshold, above which they gradually become less correlated, this method may be called semi-correlated halftoning.

As an example of this embodiment, suppose an area in the image comprises a number of pixels that indicate a color density of 4% black, 3% magenta and 3% yellow. With a predetermined density threshold of 12%, the dots for these process colors will be determined by one array of thresholds, e.g. the array of thresholds that is associated with the black process color. All colored dots will then be arranged in the same way as dots of an area of 10% black would be arranged. For another area in the image, where the pixels indicate a color density of 5% black, 4% magenta and 4% yellow, the yellow density will be split into a basic part of 3% and an excess part of 1%. The dots for the 5% black, 4% magenta and 3% yellow will be determined by the array of thresholds associated with the black process color, whereas the dots for 1% yellow will use the array of thresholds associated with the yellow process color. The chance these dots will be placed on the same position as the dots of the basic parts is 0.0012, because the two arrays of thresholds are uncorrelated. When an area of 8% black, 6% magenta and 6% yellow is comprised in the image, the dots will be arranged for 8% black and 4% magenta according to the array of threshold values associated with the black process color, whereas dots for 2% magenta are arranged according to the magenta array of threshold values and dots for 6% yellow are arranged according to the yellow array of threshold values. It has been found, that in this way a nice balance between graininess at low density and registration independent color rendering at high density is obtained.

It is noted, that in the present embodiment a full coverage of a single color may be unobtainable, because the basic part of the dots is positioned according to another array of thresholds than the excess part. If this situation occurs, depends on the size of the drops and the resolution of the print process. If so, it is possible to correct the excess part with a correction factor to enable full coverage again.

Figure 3A:
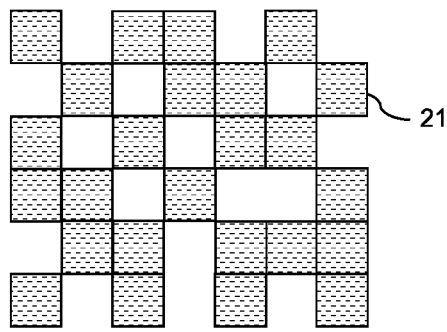
FIG. 3A to FIG. 3F show a number of dot patterns for different process colors.
Figure 3B:
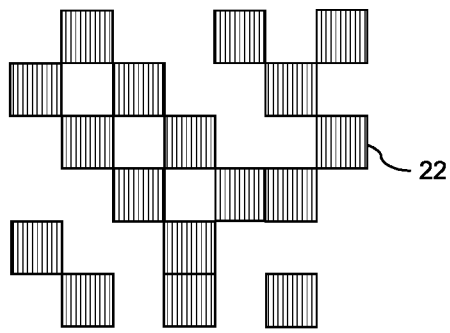
Figure 3C:
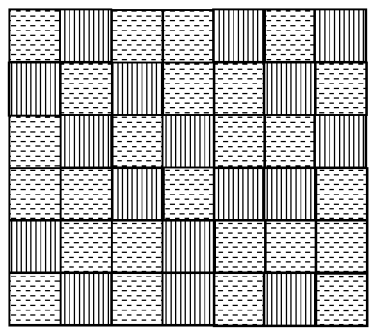
Figure 3D:
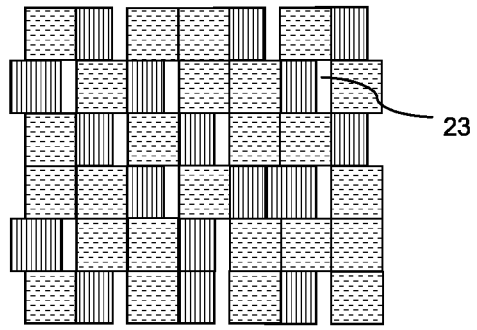
Figure 3E:
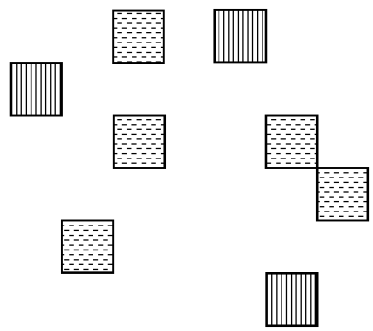
Figure 3F:
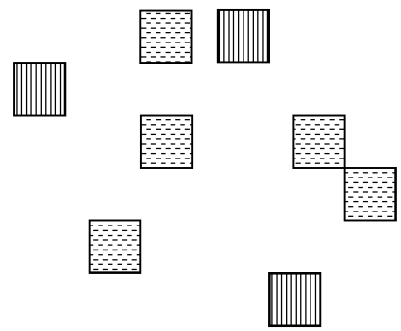

In FIG. 3A, an example of a dot pattern is shown for print positions associated with a number of pixels in a digital separation image, in which all pixels have a color density value of 60%. Color 21 is differentiated from color 22, as is shown in FIG. 3B for a dot pattern associated with a digital separation image in which the pixels have a color density of 40%. These dot patterns have been composed using a single array of threshold values and therefore complement each other in the sense that no dots overlap. In FIG. 3C, the result is shown for a composed dot pattern when there is no registration difference between the print positions of the two process colors. In FIG. 3D, a small registration difference is applied, making an area between two dots of different colors uncovered, indicated by 23, whereas the dots partially overlap on other places. This difference in registration causes a slight change of color of the area and is called sensitivity for registration differences. In FIG. 3E and FIG. 3F, it is shown that when the density of color 21 is reduced to 12% and the density of color 22 is reduced to 7%, the composed dot pattern is not very sensitive to registration differences (as applied in FIG. 3F), which enables the use of a single array of thresholds for the low total densities.

Figure 4:
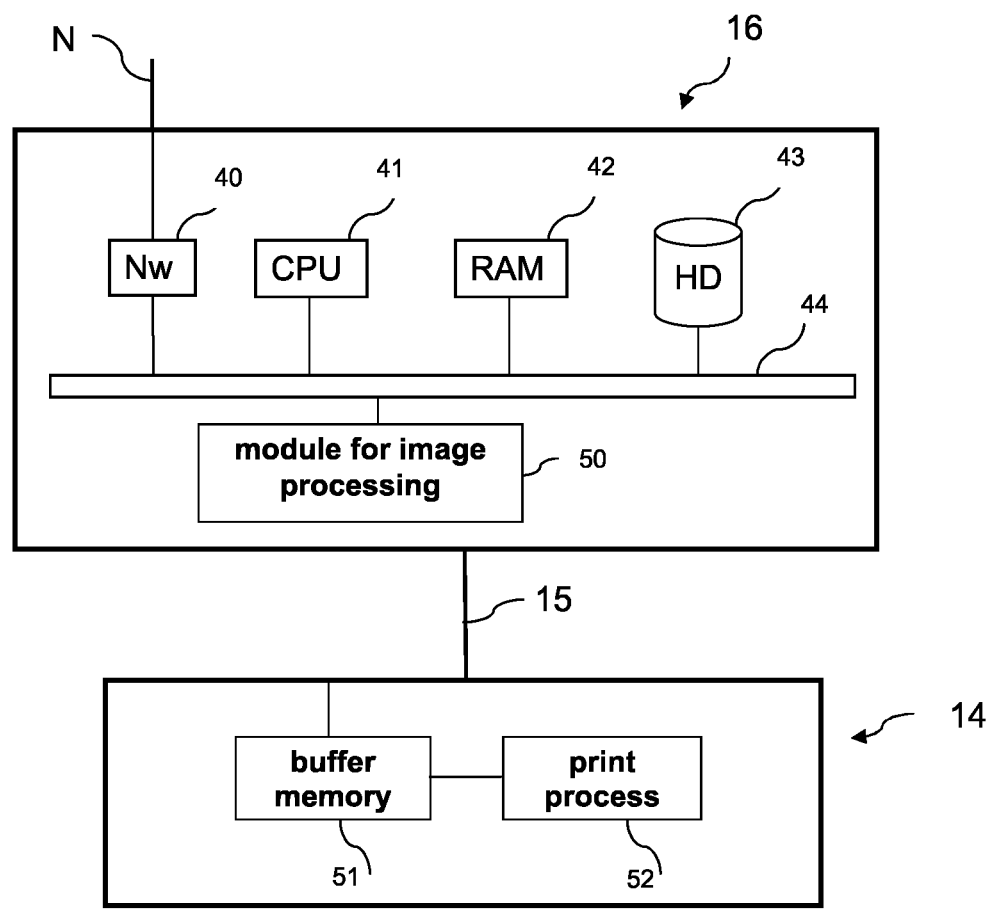
FIG. 4 is a diagram of a controller connected to a color printer.

In FIG. 4, a print system is shown, comprising a controller computer 16, a color printer 14 and a means for data transfer 15. The controller computer is connected to the network N and comprises a network connection module 40, a central processing unit 41, a volatile memory module 42, a non-volatile memory module 43 and a compression module for image processing 50, in which the halftoning process is comprised, all connected to a data-bus 44. The controller computer accepts print jobs through the network, interprets the print jobs and transforms them to image data. These are transferred to the color printer 14 through the means for data transfer 15. The color printer comprises a buffer memory 51 and a print process 52 for marking a support material with marking material, such as toner or ink.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for image processing a digital color image, the method comprising the steps of:
    generating from the digital color image for each of a number of predetermined process colors a digital separation image, each digital separation image specifying for each pixel of said digital color image a color density value for the associated process color;
    associating with each individual digital separation image a separate array of threshold values for converting the digital separation image into a print signal that indicates for each pixel whether a dot of marking material of the corresponding process color is to be applied, wherein the separate arrays of thresholds are mutually uncorrelated;
    adding up, for each pixel, the color density values of all said process colors to determine a total density value;
    splitting, for each pixel, the color density value of each process color into a basic part and an excess part, if the total density value exceeds a predetermined density threshold, wherein the predetermined density threshold is lower than 100% and a sum of the basic parts does not exceed the predetermined density threshold;
    converting the basic part, or the color density value if the total density value does not exceed the density threshold, of each process color into a print signal using a dither technique and a first array of threshold values, said dither technique and first array of threshold values being associated with one of the process colors, and
    converting the excess part of each process color into a print signal using a dither technique and an array of threshold values that is associated with the digital separation image corresponding to the process color.

2. The method according to claim 1, wherein the first array of threshold values is associated with the process color black.

3. The method according to claim 2, wherein the density threshold is between 5 and 30%.

4. The method according to claim 3, wherein the density threshold is between 10% and 20%.

5. The method according to claim 4, wherein the density threshold is 12%.

6. The method according to claim 1, wherein the density threshold is between 5 and 30%.

7. The method according to claim 6, wherein the density threshold is between 10% and 20%.

8. The method according to claim 7, wherein the density threshold is 12%.

9. A non-transitory computer readable medium comprising computer executable instructions for performing the method according to claim 1.

10. A color printer system comprising a controller for scheduling and interpreting print jobs and a print engine for marking support material, the controller comprising modules for generating print signals for a digital color image, characterized in that the controller further comprises a module for executing a method according to claim 1.

* * * * *